US012600113B2

(12) United States Patent
Sunwoo et al.

(10) Patent No.: US 12,600,113 B2
(45) Date of Patent: Apr. 14, 2026

(54) FLEXIBLE COVER WINDOW WITH IMPROVED STRENGTH

(71) Applicant: UTI INC., Chungcheongnam-do (KR)

(72) Inventors: Kukhyun Sunwoo, Gyeonggi-do (KR); Tea Joo Ha, Chungcheongnam-do (KR); Jae Suk Oh, Gyeonggi-do (KR)

(73) Assignee: UTI INC., Chungcheongnam-do (KR)

( * ) Notice: Subject to any disclaimer, the term of this patent is extended or adjusted under 35 U.S.C. 154(b) by 340 days.

(21) Appl. No.: 17/816,593

(22) Filed: Aug. 1, 2022

(65) Prior Publication Data

US 2023/0045063 A1 Feb. 9, 2023

(30) Foreign Application Priority Data

Aug. 5, 2021 (KR) ......................... 10-2021-0102841

(51) Int. Cl.
B32B 17/10 (2006.01)
B32B 7/12 (2006.01)
(Continued)

(52) U.S. Cl.
CPC ................. B32B 17/10 (2013.01); B32B 7/12 (2013.01); B32B 27/281 (2013.01); B32B 27/32 (2013.01);
(Continued)

(58) Field of Classification Search
CPC ......... B32B 17/10; B32B 7/12; B32B 27/281; B32B 27/32; B32B 27/36; B32B 27/365;
(Continued)

(56) References Cited

U.S. PATENT DOCUMENTS

2014/0017466 A1* 1/2014 Won ........................... C09J 7/22
428/354
2018/0132370 A1* 5/2018 Choi ..................... G06F 1/1652
(Continued)

FOREIGN PATENT DOCUMENTS

KR 10-2017-0122554 A 11/2017
KR 10-2019-0018114 A 2/2019
(Continued)

OTHER PUBLICATIONS

Panowicz, Robert, et al. "Properties of polyethylene terephthalate (PET) after thermo-oxidative aging." Materials 14.14 (2021): 3833 (Year: 2021).*
(Continued)

*Primary Examiner* — Michael Zhang
(74) *Attorney, Agent, or Firm* — Mendelsohn Dunleavy, P.C.

(57) ABSTRACT

Disclosed is a glass-based flexible cover window with improved strength including a planar portion formed so as to correspond to a planar region of a flexible display and a folding portion formed so as to be connected to the planar portion, the folding portion being formed so as to correspond to a folding region of the flexible display, wherein the flexible cover window includes a glass substrate, an adhesive buffer layer formed on the glass substrate, a protective film layer formed on the adhesive buffer layer, and a hard coating layer formed on the protective film layer. The protective film layer is formed on the glass substrate, whereby strength and folding characteristics of the flexible cover window are improved, and inherent texture of glass is maintained while the overall thickness of the flexible cover window is reduced, and therefore aesthetics of the flexible cover window are improved.

10 Claims, 2 Drawing Sheets

(51) Int. Cl.

| | |
|---|---|
| *B32B 27/28* | (2006.01) |
| *B32B 27/30* | (2006.01) |
| *B32B 27/32* | (2006.01) |
| *B32B 27/36* | (2006.01) |
| *B32B 27/38* | (2006.01) |

(52) U.S. Cl.

CPC ............ *B32B 27/36* (2013.01); *B32B 27/365* (2013.01); *B32B 27/308* (2013.01); *B32B 27/38* (2013.01); *B32B 2255/10* (2013.01); *B32B 2255/26* (2013.01); *B32B 2307/412* (2013.01); *B32B 2307/536* (2013.01); *B32B 2307/546* (2013.01); *B32B 2307/558* (2013.01); *B32B 2307/732* (2013.01); *B32B 2457/20* (2013.01)

(58) Field of Classification Search

CPC ... B32B 27/308; B32B 27/38; B32B 2255/10; B32B 2255/26; B32B 2307/412; B32B 2307/536; B32B 2307/546; B32B 2307/558; B32B 2307/732; B32B 2457/20

See application file for complete search history.

(56) References Cited

U.S. PATENT DOCUMENTS

| | | | |
|---|---|---|---|
| 2018/0136371 A1* | 5/2018 | Kim ........................... | B32B 7/12 |
| 2019/0196550 A1* | 6/2019 | Kim ...................... | B32B 27/308 |
| 2020/0292731 A1* | 9/2020 | Park ...................... | G06F 1/1641 |
| 2021/0291494 A1* | 9/2021 | Alderman ................ | B32B 7/12 |
| 2022/0282130 A1* | 9/2022 | Baby .......................... | C09J 9/00 |

FOREIGN PATENT DOCUMENTS

| | | | | |
|---|---|---|---|---|
| KR | 102068685 B1 * | 1/2020 | | |
| KR | 10-2020-0030663 A | 3/2020 | | |
| KR | 10-2021-0052422 A | 5/2021 | | |
| WO | WO-2020018312 A1 * | 1/2020 | ............. | B32B 17/06 |

OTHER PUBLICATIONS

Laurie Gibbons, Permabond, "Factors Affecting UV-Cure", https://permabond.com/factors-affecting-uvcure/, Mar. 20, 2014 (Year: 2014).*

* cited by examiner

FLEXIBLE COVER WINDOW WITH IMPROVED STRENGTH

CROSS-REFERENCE TO RELATED APPLICATION

This application claims priority from Korean Patent Application No. 10-2021-0102841, filed on Aug. 5, 2021, in the Korean Intellectual Property Office, the disclosure of which is incorporated herein by reference in its entirety.

BACKGROUND OF THE INVENTION

1. Field of the Invention

The present invention relates to a flexible cover window, and more particularly to a flexible cover window with improved strength configured such that strength characteristics of the flexible cover window are improved and inherent texture of glass is maintained while the overall thickness of the flexible cover window is reduced, whereby aesthetics of the flexible cover window are improved.

2. Description of the Related Art

With recent rapid development of electric and electronic technologies and an increase in new demands of the times and various demands of consumers, various types of display products have been manufactured. Thereamong, research on a flexible display capable of being folded and unfolded has been actively conducted.

At first, research on folding the flexible display was conducted, and now research on rolling and stretching the flexible display are being conducted. Not only a display panel but also a flexible cover window configured to protect the display panel must be flexible.

Such a flexible cover window must be basically flexible and must have no wrinkles at the folding region thereof after repeated folding, and image distortion must not occur.

For a conventional cover window for flexible displays, a polymer film, such as a PI film or a PET film, is attached to the surface of a display panel.

Since the mechanical strength of the polymer film is low, however, the polymer film serves merely to prevent scratches on the display panel. In addition, the polymer film has low resistance to shock and low transmittance. Furthermore, the polymer film is relatively expensive.

As the number of folds of the display increases, the folding region of the polymer film is wrinkled, whereby the folding region of the polymer film is damaged. For example, the polymer film is pressed or torn at the time of folding limit evaluation (generally 200,000 times).

In recent years, various research on a glass-based cover window has been conducted in order to overcome the limit of the polymer film cover window.

Such a glass-based cover window requires fundamental physical properties. For example, image distortion must not occur, and the glass-based cover window must have sufficient strength with respect to repetitive contact of a touch pen and specific pressure while folding characteristics must be satisfied.

In order to satisfy the strength characteristics of the flexible cover window, glass must have a specific thickness or more. In order to satisfy the folding characteristics of the flexible cover window, on the other hand, the glass must have a specific thickness or less. Consequently, research on the optimum thickness and structure of the flexible cover window at which image distortion does not occur while both the strength characteristics and the folding characteristics are satisfied is necessary.

Also, in the case in which the glass has a specific thickness or less, inherent texture of a reinforced glass is deteriorated, which must also be considered.

Therefore, there is a need for technology capable of providing a flexible cover window having an appropriate thickness necessary to secure strength and at the same time satisfying folding characteristics while maintaining inherent aesthetics of the reinforced glass.

SUMMARY OF THE INVENTION

The present invention has been made in view of the above problems, and it is an object of the present invention to provide a flexible cover window configured such that a protective film layer having a hard coating layer formed thereon is formed on a front surface of a glass substrate, whereby strength of the flexible cover window is improved.

In accordance with the present invention, the above and other objects can be accomplished by the provision of a glass-based flexible cover window with improved strength including a planar portion formed so as to correspond to a planar region of a flexible display and a folding portion formed so as to be connected to the planar portion, the folding portion being formed so as to correspond to a folding region of the flexible display, wherein the flexible cover window includes a glass substrate, an adhesive buffer layer formed on a front surface of the glass substrate, a protective film layer formed on the adhesive buffer layer, and a hard coating layer formed on the protective film layer.

The adhesive buffer layer may be made of an optically clear resin (OCR), and the OCR adhesive buffer layer may have a strength (storage modulus) of 0.01 GPa to 1 GPa.

The protective film layer may be made of any one of clear polyimide (CPI), polyethylene terephthalate (PET), polypropylene (PP), polyethylene naphthalate (PEN), and polycarbonate (PC).

In addition, the protective film layer may have a thickness of 5 to 100 μm, and the adhesive buffer layer may have a thickness of 1 to 75 μm.

The flexible cover window may further include a functional layer formed on the hard coating layer.

In addition, the adhesive buffer layer may be made of a material configured such that the adhesive buffer layer has an equal strength or different strengths at the planar portion and the folding portion.

Meanwhile, the glass substrate may be integrally formed, and may be formed such that the folding portion is slimmer than the planar portion.

The flexible cover window may further include an adhesive layer formed on a back surface of the glass substrate so as to be adhered to a flexible display panel, wherein the adhesive layer may be formed so as to have an optically clear adhesive (OCA) structure or an OCA/support film layer/OCA structure.

The support film layer may be made of at least one of polyethylene terephthalate (PET), polypropylene (PP), polyethylene naphthalate (PEN), and polycarbonate (PC).

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
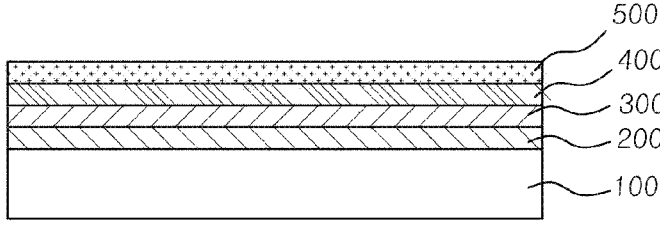
FIGS. 1 to 6 are schematic views showing various embodiments of a flexible cover window with improved strength according to the present invention.

The present invention relates to a flexible cover window, and more particularly to a flexible cover window configured such that a protective film layer having a hard coating layer formed thereon is formed on a front surface of a glass substrate by lamination using an adhesive buffer layer, whereby surface hardness, pen drop characteristics, and folding characteristics of the flexible cover window are improved.

In addition, adhesion between the glass substrate and the protective film layer according to the present invention is performed by the adhesive buffer layer, an OCR, which has higher hardness than a conventional OCA, is used as the adhesive buffer layer, whereby surface hardness of the flexible cover window is further improved, and tight contact between the protective film layer and the glass substrate is excellent, whereby deformation of the flexible cover window at the interface thereof is minimized even due to shock, such as pen drop, while overall durability of the flexible cover window is improved.

Hereinafter, the present invention will be described in detail with reference to the accompanying drawings. FIGS. 1 to 6 are schematic views showing various embodiments of a flexible cover window with improved strength according to the present invention.

As shown, the flexible cover window with improved strength according to the present invention is a glass-based flexible cover window including a planar portion formed so as to correspond to a planar region of a flexible display and a folding portion formed so as to be connected to the planar portion, the folding portion being formed so as to correspond to a folding region of the flexible display, wherein the flexible cover window includes a glass substrate 100, an adhesive buffer layer 200 formed on a front surface of the glass substrate 100, a protective film layer 300 formed on the adhesive buffer layer 200, and a hard coating layer 400 formed on the protective film layer 300.

In the present invention, a front surface means a surface that a user can touch, a surface that a touch pen contacts, and an upper surface in the drawings. Also, in the present invention, a back surface, which is a surface opposite to the front surface, means a surface opposite to the surface that is touched, i.e. a surface facing in a direction toward a display panel, and a lower surface in the drawings.

In the present invention, the folding region of the display is a region of the display at which the display is folded in two or a region of the display at which the display is bent or rolled. Also, in the present invention, a folding region of the flexible cover window corresponding to the folding region of the display is referred to as a "folding portion" of the flexible cover window, and a planar region of the flexible cover window excluding the folding portion is referred to as a "planar portion" of the flexible cover window.

In particular, the flexible cover window according to the present invention is a glass-based flexible cover window, and a chemically strengthened glass substrate 100 is used.

The glass substrate 100 according to the present invention may be entirely flat (the thicknesses of the folding portion and the planar portion are equal to each other), or the folding portion may be formed so as to have a smaller thickness than the planar portion, i.e. the folding portion may be formed so as to be slimmer than the planar portion.

In general, the thickness of the planar portion of the flexible cover window is 30 to 300 μm, and the thickness of the folding portion of the flexible cover window is about 10 to 100 μm. That is, a very thin sheet of glass is processed to form the folding portion. Here, the folding portion may be formed so as to have a uniform thickness, or may be formed so as to have a thickness gradually increasing from the middle to the edge of the folding region. That is, the folding portion may be formed in a straight line or a curved line.

In addition, an etched pattern may be formed in the folding portion and the planar portion or only in the folding portion in order to improve strength and folding characteristics of the glass substrate 100.

The flexible cover window according to the present invention is formed over the entire surface of the flexible display panel in order to protect the flexible display panel. Alternatively, the flexible cover window may also be disposed on a clear polyimide (CPI) cover in order to protect the CPI cover.

A flexible cover window with improved strength according to an embodiment of the present invention includes a glass substrate 100, an adhesive buffer layer 200 formed on a front surface of the glass substrate 100, a protective film layer 300 formed on the adhesive buffer layer 200, and a hard coating layer 400 formed on the protective film layer 300.

A structure for strength improvement according to the present invention is formed on the front surface of the glass substrate 100, wherein the protective film layer 300, which is somewhat rigid, and the hard coating layer 400, which is formed on the protective film layer 300, are formed on the glass substrate 100 by lamination using the adhesive buffer layer 200, which is located under the protective film layer 300, whereby surface hardness of the flexible cover window is improved, In addition, the thicknesses, the materials, and the degrees of hardening of the hard coating layer 400, the protective film layer 300, and the adhesive buffer layer 200 are adjusted, whereby folding characteristics of the flexible cover window is improved, and the hard coating layer 400, the protective film layer 300, and the adhesive buffer layer 200 are made of materials having different levels of hardness, whereby the force of shock applied to the flexible cover window is uniformly dispersed. In particular, shock force, such as pen drop, is dispersed or absorbed.

Generally, in the case in which the flexible cover window is manufactured using a glass material, the thickness of the glass substrate 100 must be small. In order to secure strength characteristics, however, the glass substrate 100 must have a specific thickness or more.

For example, in the case in which the radius of curvature at the time of folding must satisfy a minimum of 0.5 mm, the flexible cover window may have a thickness of 200 μm or less, preferably 20 to 100 μm. As the thickness of the flexible cover window is decreased, the strength of the flexible cover window is also decreased. Particular, in the case in which an object having a small sectional area collides with the upper surface (the front surface) of the glass substrate 100, i.e. when pen drop occurs, the entire glass substrate 100 may be deformed or damaged around a pen-drop contact portion thereof.

In particular, for a flexible cover window having a slimmed folding region, the thickness of the folding region is particularly small, whereby pen-drop resistance characteristics thereof are very weak. In addition, a stress difference occurs due to a thickness difference between the folding region and each of the planar regions, whereby a waviness problem of the glass substrate 100 also occurs. As a result, shock resistance of the flexible cover window is very low.

In the present invention, the protective film layer 300 having the hard coating layer 400 formed thereon is formed on the entirety of the front surface of the glass substrate 100 in order to improve shock resistance through improvement in the pen-drop resistance characteristics at the folding portion and at the same time to improve folding characteristics while improving overall strength of the glass substrate 100.

In particular, the thicknesses or the physical properties of the hard coating layer 400 and the protective film layer 300 are adjusted and the protective film layer 300 having the hard coating layer 400 formed thereon is formed on the glass substrate 100 by lamination using the adhesive buffer layer 200 in order to disperse or absorb shock force without necessity to perform troublesome work, such as a masking process or an etching process, such that a specific pattern or folding portion is formed on the glass substrate 100 in order to improve strength characteristics and folding characteristics, as in the conventional art, and therefore process simplification is achieved.

The hard coating layer 400 is first formed on the protective film layer 300, the adhesive buffer layer 200 is formed on the glass substrate 100 by coating, and the protective film layer 300 having the hard coating layer 400 formed thereon is formed on the glass substrate 100 by lamination using the adhesive buffer layer 200. The adhesive buffer layer 200 is UV-hardened, whereby the protective film layer 300 and the glass substrate 100 are stably laminated.

An optically clear adhesive (OCA) or an optically clear resin (OCR) may be used as the hard coating layer 400. The OCA or the OCR is a transparent resin having almost the same refractive index as glass (having a refractive index of 1.5). For example, acrylic, epoxy, silicone, urethane, a urethane composite, a urethane acrylic composite, a sol-gel hybrid material, or a siloxane-based material may be used. The transparent resins may be mixed in various combinations depending on the nature of the transparent resins in order to adjust hardness. For example, the content of a resin, such as acrylic or epoxy, may be increased in order to increase hardness, and the content of a resin, such as silicone or a urethane composite, may be increased in order to decrease hardness. In addition, the content of an organic material and an inorganic material in an organic and inorganic sol-gel hybrid material may be adjusted to reinforce strength or elasticity.

Any film constituted by a transparent and rigid resin may be used as the protective film layer 300. Preferably, a transparent thin resin film having higher rigidity than the adhesive buffer layer 200 is used.

Specifically, any one of clear polyimide (CPI), polyethylene terephthalate (PET), polypropylene (PP), polyethylene naphthalate (PEN), and polycarbonate (PC) may be used.

Preferably, the protective film layer 300 has a thickness of 5 to 100 μm, and the adhesive buffer layer 200 has a thickness of 1 to 75 μm.

In one embodiment of the present invention, lamination between the glass substrate 100 and the protective film layer 300 via the adhesive buffer layer 200 is achieved through UV-hardening at 200° C. to 300° C. for about one hour.

A transparent resin having almost the same refractive index as glass (having a refractive index of 1.5), such as an optically clear resin (OCR), may be used as the adhesive buffer layer 200. For example, acrylic, epoxy, silicone, urethane, a urethane composite, a urethane acrylic composite, a sol-gel hybrid material, or a siloxane-based material may be used. Hardening conditions or materials may be selected to adjust hardness of the adhesive buffer layer 200.

Preferably, the strength (storage modulus) of the OCR adhesive buffer layer 200 ranges from 0.01 GPa to 1 GPa. Consequently, an OCR, which has higher hardness than a conventional OCA, is used as the adhesive buffer layer 200, whereby surface hardness of the flexible cover window is further improved, and tight contact between the protective film layer 300 and the glass substrate 100 is excellent, whereby deformation of the flexible cover window at the interface thereof is minimized even due to shock, such as pen drop, while overall durability of the flexible cover window is improved.

In the present invention, a structure including the adhesive buffer layer 200 and the protective film layer 300 is formed on the front surface of the glass substrate 100, whereby the shape of the glass substrate 100 is maintained by the protective film layer 300 when the glass substrate 100 is damaged or replaced, and therefore it is possible to easily replace the glass substrate 100.

Also, in the present invention, a structure including the hard coating layer 400, the protective film layer 300, and the adhesive buffer layer 200 is formed on the front surface of the glass substrate 100, whereby limitation in thickness of the glass substrate 100 is minimized, and a thin protective film layer 300 is used, whereby it is possible to provide a thin, lightweight cover window.

Generally, in the case in which shock, such as pen drop, is applied to the flexible cover window, shock that is transmitted vertically is stronger than shock that is transmitted horizontally. The protective film layer 300 according to the present invention is formed on the front surface of the glass substrate 100. Consequently, it is possible to efficiently disperse or absorb vertical shock and to support the glass substrate 100, whereby it is possible to remarkably improve pen-drop resistance characteristics.

Also, in the flexible cover window according to the present invention, the protective film layer 300 having the hard coating layer 400 formed thereon is formed on the front surface of the glass substrate 100, whereby inherent texture of glass is maintained while the overall thickness of the flexible cover window is reduced, and therefore aesthetics of the flexible cover window are improved.

In addition, a functional layer 500 may be formed on the hard coating layer 400 according to the present invention.

Since the front surface of the flexible cover window is touched, the functional layer 500 may be implemented by a surface protective layer with further reinforced strength. In the case in which the functional layer 300 is used as a surface protective layer, a material including a high content of a resin having relatively high hardness when hardened, such as acrylic or epoxy, may be used.

In addition, an anti-fingerprint (AF) or anti-reflective (AR) function may be imparted to the functional layer 500 as needed. Resins having such a function may be combined, or various patterns, such as a moth-eye pattern, may be formed at the functional layer 500 to realize the function.

In one embodiment of the present invention, as shown in FIG. 1, the glass substrate 100 is entirely flat (the thicknesses of the folding portion and the planar portion are equal to each other), and the adhesive buffer layer 200, the protective film layer 300, the hard coating layer 400, and the functional layer 500 are formed on the glass substrate 100. The front surface of the glass substrate 100 means an upper surface of the glass substrate in the drawings.

Shock applied to the front surface (the touch surface) of the glass substrate 100 is dispersed or absorbed by the protective film layer 300 and the adhesive buffer layer 200. In addition, the protective film layer 300 and the adhesive buffer layer 200 are formed over the entire surface of the glass substrate 100 in order to support the glass substrate 100.

Also, in the present invention, the protective film layer 300 may be formed so as to have a thickness of 5 to 100 μm, which is a thickness required to efficiently absorb or disperse shock in consideration of the overall thickness and folding characteristics of the flexible cover window.

If the thickness of the protective film layer 300 is less than the above thickness range, a shock dispersion effect may be insignificant. If the thickness of the protective film layer 300 is greater than the above thickness range, the thickness of the flexible cover window may be increased, and therefore folding characteristics of the flexible cover window may be deteriorated.

In the case in which the protective film layer 300 having the hard coating layer 400 formed thereon is formed on the front surface of the glass substrate 100, as described above, shock, such as pen drop, is supported or dispersed, whereby pen-drop resistance characteristics, folding characteristics, and the overall strength characteristics of the flexible cover window are improved.

The protective film layer 300 according to the present invention is made of a material different from the material for the adhesive buffer layer 200 such that the strength of the protective film layer 300 is different from the strength of the adhesive buffer layer 200, whereby it is possible to efficiently disperse or absorb shock applied to the glass substrate 100 and to stably support the glass substrate 100.

In addition, the adhesive buffer layer 200 is made of a material configured such that the adhesive buffer layer 200 has equal strength or different strengths at the planar portion and the folding portion, whereby the strength characteristics and the folding characteristics of the flexible cover window are reinforced depending on the specifications of products in various environments.

Figure 2:
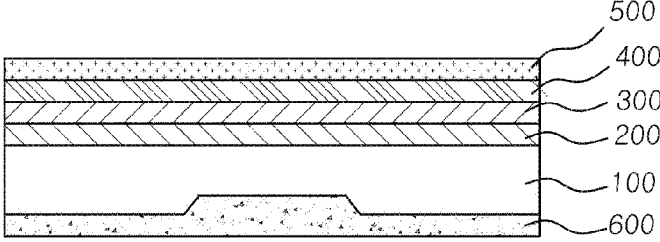

In another embodiment of the present invention, as shown in FIG. 2, the folding portion of the glass substrate 100 is formed so as to be slimmer than the planar portion of the glass substrate 100, the adhesive buffer layer 200, the protective film layer 300, the hard coating layer 400 are formed on the glass substrate 100, and the functional layer 500 is formed thereon. As a result, the folding characteristics of the flexible cover window as well as the strength characteristics of the flexible cover window are further improved.

A resin layer 600 is formed on the surface of the glass substrate 100 at which the slimmed folding portion is formed, whereby the display panel and the flexible cover window are coupled to each other without gaps, and visibility in shape of the slimmed folding portion is minimized.

In FIG. 2, the slimmed folding portion is formed so as to be located at the back surface of the glass substrate 100. The slimmed folding portion may be formed the front surface, the rear surface, or the opposite surfaces of the glass substrate 100 depending on the specifications of products.

As shown in FIGS. 3 to 6, an adhesive layer is formed on a back surface of the flexible cover window, i.e. the back surface of the glass substrate or a back surface of the PI coating layer, so as to be adhered to the flexible display panel. The adhesive layer may be formed so as to have an optically clear adhesive (OCA) structure shown in FIGS. 3 and 4 or an OCA/support film layer/OCA structure shown in FIGS. 5 and 6.

In addition, at least one of polyethylene terephthalate (PET), polypropylene (PP), polyethylene naphthalate (PEN), and polycarbonate (PC) may be used as the support film layer, and the support film layer may have a plurality of layers formed through the medium of an OCA.

Figure 3:
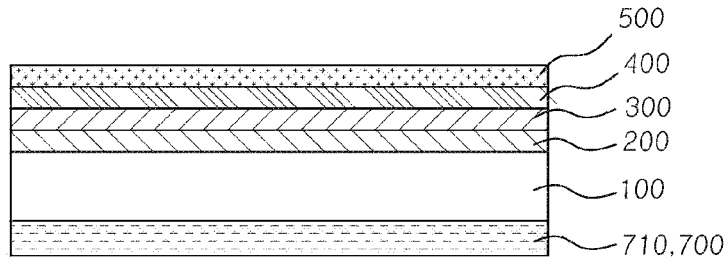
Figure 4:
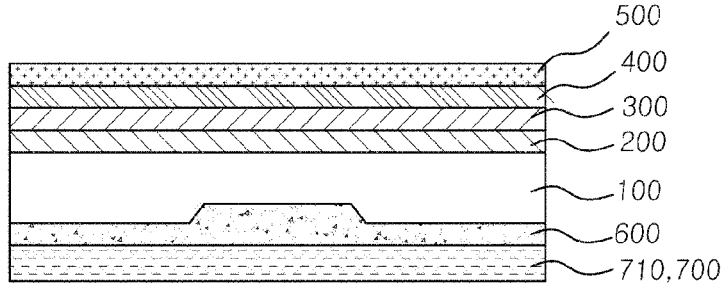
Figure 5:
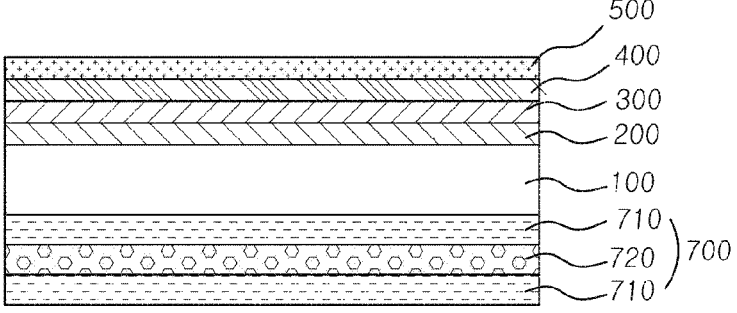
Figure 6:
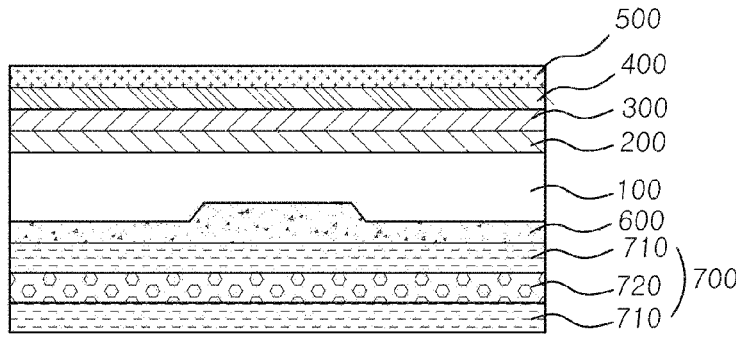

In the case in which the adhesive layer is constituted by a single OCA layer, as shown in FIGS. 3 and 4, the thickness of the adhesive layer may be about 10 μm to 50 μm. In the case in which the adhesive layer is formed so as to have an OCA/support film layer/OCA structure, as shown in FIGS. 5 and 6, the upper OCA may be formed so as to have a thickness of 10 μm to 50 μm, the support film layer may be formed so as to have a thickness of 10 μm to 50 μm (haze of 3.0 or less), and the lower OCA may be formed so as to have a thickness of 10 μm to 75 μm.

In the case in which the adhesive layer is formed on the back surface of the glass substrate so as to have an OCA/ support film layer/OCA structure, it is possible to absorb microscopic deformation due to the difference in elongation between the glass substrate and the display panel, whereby it is possible to prevent delamination or buckling at the folding portion, and therefore it is possible to improve lifespan of the flexible cover window and to minimize distortion of an image at the folding portion.

An upper surface of the adhesive layer is covered with a cover film, and the cover film is removed such that the adhesive layer is attached to a surface of the display panel. At this time, in order to minimize capture of air bubbles between the display panel and the flexible cover window (the adhesive layer), it is preferable to spray water to the surface of the display panel and to laminate the display panel and the flexible cover window.

In the present invention, the protective film layer 300 having the hard coating layer 400 formed thereon is formed on the glass substrate 100 by lamination using the adhesive buffer layer 200, whereby shock, such as pen drop, is further dispersed or absorbed, and therefore shock resistance is further improved.

In addition, the thicknesses and the physical properties of the hard coating layer 400, the protective film layer 300, and the adhesive buffer layer 200 according to the present invention are appropriately adjusted, whereby it is possible to minimize the occurrence of cracks at the folding portion depending on the specifications of products, and the protective film layer 300 is stably and uniformly laminated on the entirety of the glass substrate 100, whereby it is possible to secure flatness of the portion of the flexible cover window that abuts the display panel.

In addition, elastic force of the flexible cover window at the surface of the flexible cover window that abuts the display panel is reinforced by the adhesive buffer layer 200 according to the present invention, whereby shock resistance of the flexible cover window is improved, and it is possible to prevent dispersion of the glass substrate 100 when the glass substrate 100 is broken.

Also, in the present invention, the flexible cover window is made of a composite material including glass and a resin material, whereby flexibility, restoring force, elastic force, and strength characteristics of the flexible cover window are reinforced by the resin material while texture of the glass is maximally maintained.

Table 1 below shows data on pen-drop resistance characteristics and measured hardness of a flexible cover window according to an example of the present invention and flexible cover windows according to comparative examples.

TABLE 1

|  | Pen-drop resistance characteristics | Measured hardness |
|---|---|---|
| Comparative Example 1 (Bare) | 1 cm to 2 cm | 4H |
| Comparative Example 2 | 2 cm to 3 cm | 3H |
| Comparative Example 3 | 10 cm | B |
| Example | 10 cm or more | 3H |

In Comparative Example 1, a glass substrate (bare) having a thickness of 30 μm was used. In Comparative Example 2, a hard coating layer 400 having a thickness of about 2 μm was formed on a glass substrate having a thickness of 30 μm. In Comparative Example 3, a protective film, such as CPI or TPU, was formed on a glass substrate having a thickness of 30 μm.

In the example of the present invention, a protective film layer 300 having a thickness of 6 μm was formed on a glass substrate having a thickness of 30 μm, and a hard coating layer having a thickness of 1 μm and an adhesive buffer layer having a thickness of 2 μm were formed thereon.

As shown in Table 1 above, it can be seen that, for the example of the present invention, pen-drop resistance characteristics, 10 cm or more, were remarkably improved, and hardness, 3H or more, was improved.

In the flexible cover window according to the present invention, as described above, the protective film layer having the hard coating layer formed thereon is formed on the glass substrate by lamination using the adhesive buffer layer, whereby strength characteristics of the flexible cover window are improved and inherent texture of glass is maintained while the overall thickness of the flexible cover window is reduced, and therefore aesthetics of the flexible cover window are improved.

As is apparent from the above description, the present invention relates to a flexible cover window, and more particularly to a flexible cover window configured such that a protective film layer having a hard coating layer formed thereon is formed on a front surface of a glass substrate by lamination using an adhesive buffer layer, whereby surface hardness, pen-drop resistance characteristics, and folding characteristics of the flexible cover window are improved.

For a conventional flexible cover window, a separate protective film is additionally applied to the glass substrate in order to reinforce low pen-drop resistance characteristics. In the flexible cover window according to the present invention, however, the protective film layer having the hard coating layer formed thereon is formed on the front surface of the glass substrate, whereby inherent texture of glass is maintained while the overall thickness of the flexible cover window is reduced, and therefore aesthetics of the flexible cover window are improved.

In addition, adhesion between the glass substrate and the protective film layer according to the present invention is performed by the adhesive buffer layer, an OCR, which has higher hardness than a conventional OCA, is used as the adhesive buffer layer, whereby surface hardness of the flexible cover window is further improved, and tight contact between the protective film layer and the glass substrate is excellent, whereby deformation of the flexible cover window at the interface thereof is minimized even due to shock, such as pen drop, while overall durability of the flexible cover window is improved.

In addition, the flexible cover window according to the present invention is implemented using a combination of glass and a resin material, whereby flexibility, restoring force, elastic force, and strength characteristics are reinforced by the resin material while texture of the glass is maximally maintained. In particular, the resin material absorbs shock, such as pen drop, whereby shock resistance is further improved.

Although the present invention has been described in detail based on concrete embodiments, those skilled in the art will appreciate that the present invention is not limited thereto and that various modifications, additions, and substitutions are possible without departing from the scope and spirit of the invention as disclosed in the accompanying claims.

What is claimed is:

1. A glass-based flexible cover window with improved strength comprising a planar portion formed so as to correspond to a planar region of a flexible display and a folding portion formed so as to be connected to the planar portion, the folding portion being formed so as to correspond to a folding region of the flexible display, wherein the flexible cover window comprises:
   a glass substrate;
   an adhesive buffer layer formed on a front surface of the glass substrate, wherein the adhesive buffer layer is made of an optically clear resin (OCR) having a strength (storage modulus) greater than 0.01 GPa and less than or equal to 1 GPa, wherein the optically clear resin is selected from the group consisting of acrylic, epoxy, urethane, urethane acrylic composite, and a urethane composite;
   a protective film layer formed on the adhesive buffer layer, wherein the protective film layer has a higher rigidity than the adhesive buffer layer, and a strength of the protective film layer is different from a strength of the adhesive buffer layer, and the protective film layer is made of any one of polypropylene (PP) and polyethylene naphthalate (PEN); and
   a hard coating layer formed on the protective film layer, wherein the protective film layer on which the hard coating layer is formed is laminated using the adhesive buffer layer on the front surface of the glass substrate, so that the hard coating layer, the protective film layer and the glass substrate form a lamination structure, and the adhesive buffer layer is a UV-hardened layer, and wherein a thickness of the adhesive buffer layer is greater than a thickness of the hard coating layer, and the thickness of the hard coating layer is smaller than a thickness of the protective film layer.

2. The flexible cover window according to claim 1, wherein the protective film layer has a thickness of 5 to 100 μm.

3. The flexible cover window according to claim 1, wherein the adhesive buffer layer has a thickness of 1 to 75 μm.

4. The flexible cover window according to claim 1, further comprising a functional layer formed on the hard coating layer.

5. The flexible cover window according to claim 1, wherein the adhesive buffer layer is made of a material configured such that the adhesive buffer layer has an equal strength or different strengths at the planar portion and the folding portion.

6. The flexible cover window according to claim 1, wherein the glass substrate is integrally formed.

7. The flexible cover window according to claim 6, wherein the glass substrate is formed such that the folding portion is slimmer than the planar portion.

8. The flexible cover window according to claim 1, further comprising an adhesive layer formed on a back surface of the glass substrate and configured to be adhered to a flexible display panel of the flexible display.

9. The flexible cover window according to claim 8, wherein the adhesive layer is formed so as to have an optically clear adhesive (OCA) structure or an OCA/support film layer/OCA structure.

10. The flexible cover window according to claim 9, wherein the support film layer is made of at least one of polyethylene terephthalate (PET), polypropylene (PP), polyethylene naphthalate (PEN), and polycarbonate (PC).

* * * * *